(12) United States Patent
Graetz et al.

(10) Patent No.: US 7,251,924 B1
(45) Date of Patent: Aug. 7, 2007

(54) NON-DETACHABLE CHAIN LINK FOR MATERIAL MOVER CHAIN

(75) Inventors: Jamie Graetz, Pound, WI (US); James Zak, Pound, WI (US)

(73) Assignee: Graetz Contract Mfg., LLC, Pound, WI (US)

( * ) Notice: Subject to any disclaimer, the term of this patent is extended or adjusted under 35 U.S.C. 154(b) by 0 days.

(21) Appl. No.: 11/484,018

(22) Filed: Jul. 10, 2006

(51) Int. Cl.
*B65G 19/24* (2006.01)
*F16G 15/04* (2006.01)

(52) U.S. Cl. ............................... 59/85; 59/93; 198/850
(58) Field of Classification Search ............... 59/78, 59/80, 85, 90, 93; 198/850, 852, 853
See application file for complete search history.

(56) References Cited

U.S. PATENT DOCUMENTS

| | | | |
|---|---|---|---|
| 181,082 A * | 8/1876 | Levalley | 474/235 |
| 2,554,589 A | 5/1951 | Patz et al. | |
| 2,712,760 A | 7/1955 | Patz et al. | |
| 2,785,578 A * | 3/1957 | Nold | 59/85 |
| 2,825,381 A * | 3/1958 | Eddy | 59/95 |
| 3,013,651 A | 12/1961 | Patz et al. | |
| 3,368,344 A | 2/1968 | Graetz | |
| 3,447,667 A | 6/1969 | Patz et al. | |
| 4,487,013 A | 12/1984 | Worsley et al. | |
| 4,685,555 A * | 8/1987 | Smith | 59/85 |
| 5,341,634 A | 8/1994 | Straight | |
| 7,032,372 B1 | 4/2006 | Horvath | |

* cited by examiner

*Primary Examiner*—David Jones
(74) *Attorney, Agent, or Firm*—Patterson, Thuente, Skaar & Christensen, P.A.

(57) ABSTRACT

The present invention provides a non-detachable chain link for a material mover chain. Chain link comprises a body portion having an aperture therethrough and a hook portion including a tip portion. A recess defined by the hook portion is adapted to contain one or more bearing surfaces on the body portion of an adjacent link in a chain comprised of a plurality of such links. The tip portion has a greater width than the aperture to prevent the hook portion from falling through the aperture of an adjacent link. This prevents chain links from coming detached during operation due to an object falling on the chain or excessive slack developing in the chain.

6 Claims, 8 Drawing Sheets

NON-DETACHABLE CHAIN LINK FOR MATERIAL MOVER CHAIN

FIELD OF THE INVENTION

The present invention relates generally to a non-detachable chain link and more specifically to a non-detachable chain link for use in a material mover chain.

BACKGROUND OF THE INVENTION

Barns and other areas are often cleaned by a power driven conveyor having an endless chain comprising a plurality of links with a series of spaced apart flights secured at one end to a chain and extending outwardly from the chain. The chain is typically trained around suitable guides and pulleys and located to be dragged through various troughs and other areas of the barn. The flights are dragged by the chain and push manure and other debris along the chain's path and into a discharge area. Such barn cleaners and chain links and flights for use in such barn cleaners are described and depicted in U.S. Pat. Nos. 2,554,589; 2,712,760; 3,013,651; and 3,447,667, which are hereby incorporated by reference. Such chains are also commonly used in saw mills and other material handling units.

A chain link suitable for use in such an application is disclosed in U.S. Pat. No. 2,712,760. Such a chain link is adapted to be quickly and readily assembled and disassembled while not separating as the links are pulled and twisted relative to one another during operation. However, such chain links have a tendency to become detached from one another when there is excessive slack (axial shifting of links relative to one another) in the chain or when a log or other heavy object falls on the chain. Accordingly, it would be desirable for chain links in a material mover chain to remain attached even when the chain develops excessive slack or an object falls on the chain.

SUMMARY OF THE INVENTION

The present invention provides a non-detachable chain link for a material mover chain. Chain link comprises a body portion having an aperture therethrough and a hook portion including a tip portion. A recess defined by the hook portion is adapted to contain one or more bearing surfaces on the body portion of an adjacent link in a chain comprised of a plurality of such links. The tip portion has a greater width than the aperture to prevent the hook portion from falling through the aperture of an adjacent link. This prevents chain links from coming detached during operation due to an object falling on the chain or excessive slack developing in the chain.

BRIEF DESCRIPTION OF THE DRAWINGS

The present disclosure will be more completely understood and appreciated by referring to the following more detailed description in conjunction with the accompanying drawings of which.

DETAILED DESCRIPTION OF THE DRAWINGS

Figure 1A:
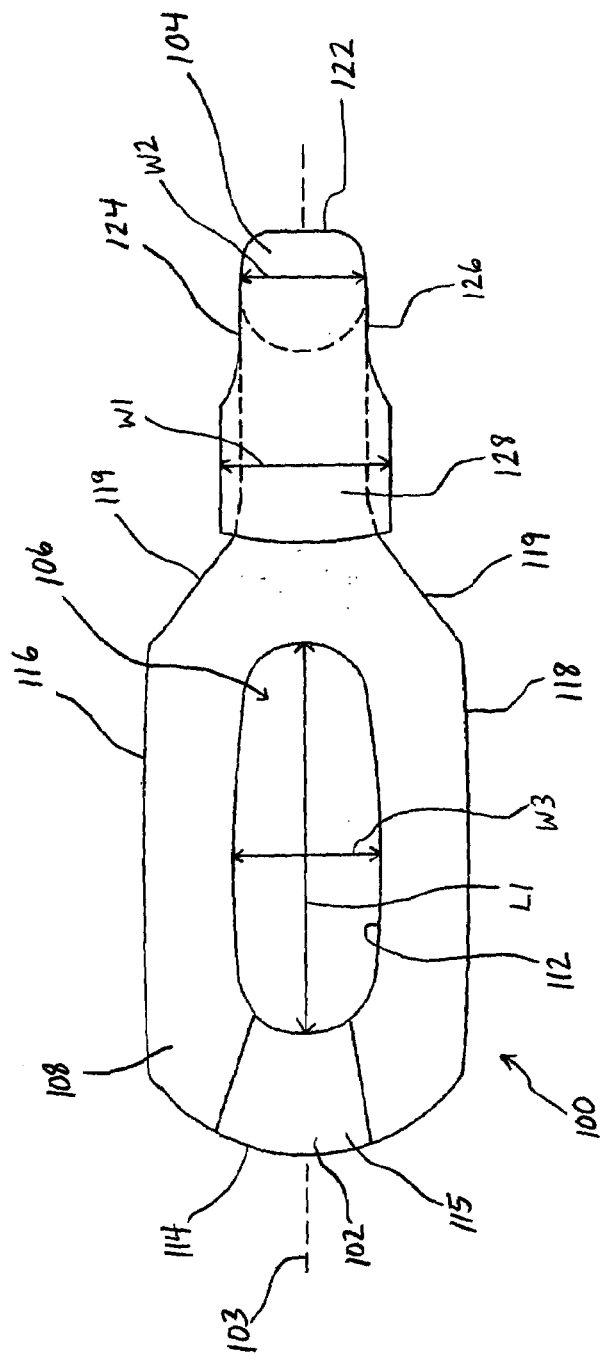
FIG. 1A is a top view of a chain link according to the present disclosure.
Figure 1B:
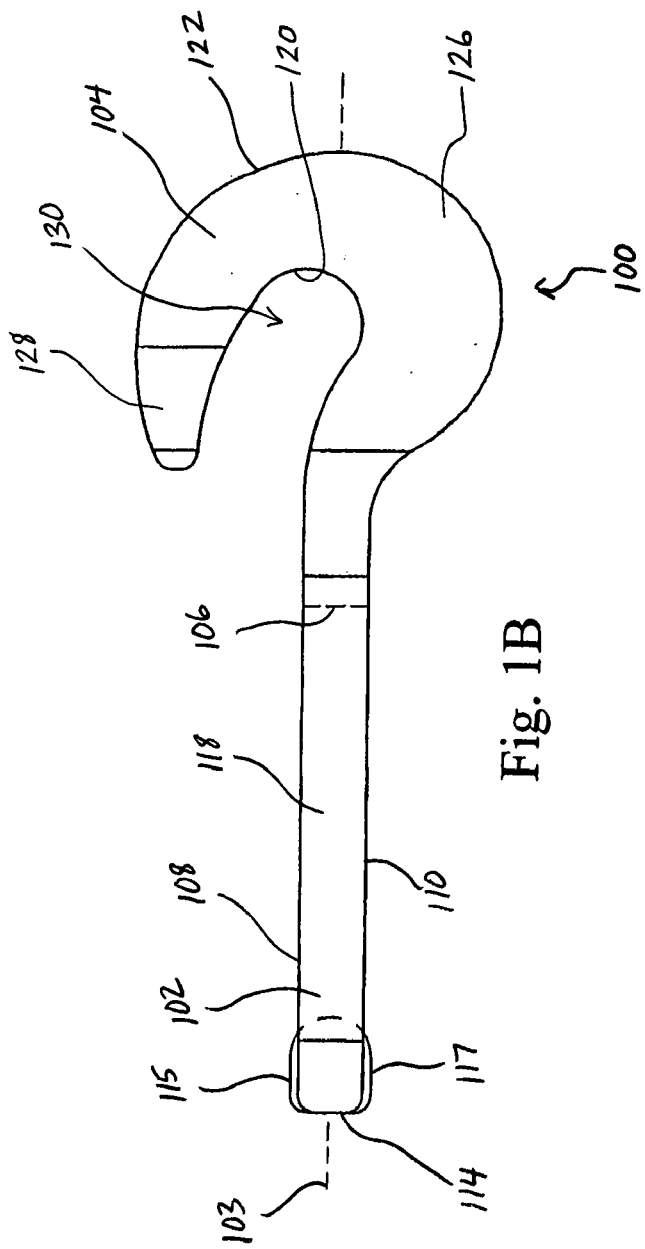
FIG. 1B is a side view of a chain link according to the present disclosure.

Referring to FIG. 1A and FIG. 1B, there can be seen a chain link 100 according to the present disclosure. Chain link 100 comprises a body portion 102 integrally formed with a hook portion 104 and has a longitudinal axis 103. Body portion 102 has an aperture 106 therethrough and comprises an upper surface 108 and opposing lower surface 110, an inner surface 112, a bottom surface 114, and first 116 and second 118 opposing side surfaces. Upper surface 108 and lower surface 110 are preferably substantially planar, except for one or more bearing surfaces 115, 117. Bearing surfaces 115, 117 are areas of compressed material that can extend slightly outwardly from upper surface 108 and/or lower surface 110 between inner surface 112 and bottom surface 114. Bearing surfaces 115, 117 provide increased wear resistance where the hook portion 104 of one chain link 100 contacts the body portion 102 of another chain link 100. Bottom surface 114 spans first side surface 116 and second side surface 118 and is preferably arcuate. First 116 and second 118 side surfaces taper inward at 119 to intersect hook portion 104.

Hook portion 104 comprises an inner surface 120 that is contiguous with upper surface 108 of body portion 102, an outer surface 122 that is contiguous with lower surface 110 of body portion 102, and a first side surface 124 and second opposing side surface 126 that are contiguous with first 116 and second 118 side surfaces of body portion 102. Curved inner surface 120 creates a recess 130 in hook portion 104. Recess 130 is adapted to fit over the bearing surfaces 115, 117 on the body portion 102 of an adjacent link 100. Hook portion 104 further includes a tip portion 128 that can have a greater width W1 as compared to the width W2 of the remainder of hook portion 104 between first side surface 124 and second side surface 126. The ratio of W1 to W2 can be about 1.5:1, but can be greater or lower. Tip portion 128 also has a greater width W1 than the width W3 of the aperture 106 and width W1 is also less than the length L1 of the aperture 106. The ratios of W1 to W3 and W1 to L1 can be 1.2:1 and 0.4:1, respectively, but can vary according to the needs of a particular application.

Chain link 100 can preferably be formed by hot hammer forging steel. The strength of chain link 100 can be increased by heat-treating the steel chain link 100 after it is formed. A heat-treated, steel chain link 100 can yield over 32 tons of pull strength. Chain link 100 is preferably hardened to a hardness of between 32 and 42 on the Rockwell "C" hardness scale. Once formed, all sharp edges and burrs should be removed from chain link 100.

Figure 2:
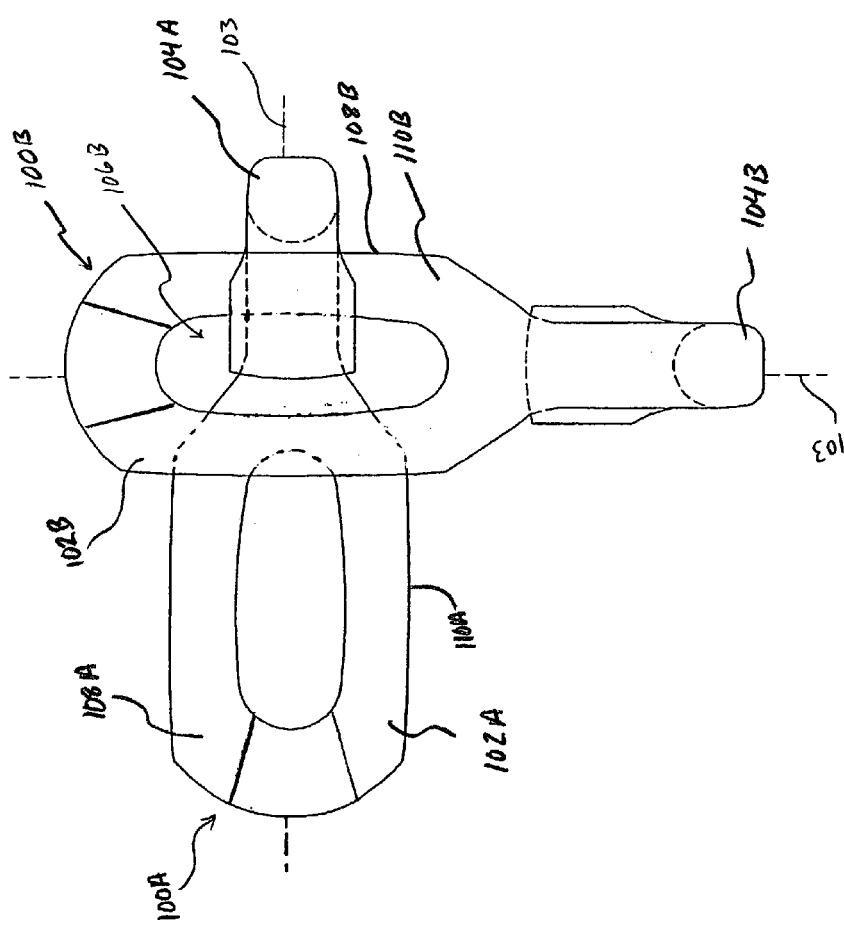
FIG. 2 is a view of a pair of chain links according to the present disclosure.

Referring now to FIGS. 2-7, the interlocking of a pair of chain links 100A, 100B is demonstrated. Chain links 100A, 100B are initially longitudinally transversely disposed in a generally parallel relationship. To interlock chain links 100A, 100B, the hook portion 104A of a first chain link 100A is inserted onto the body portion 102B of the second chain link 100B. As can be seen in FIG. 2, hook portion 104A of first chain link 100A is initially inserted onto body portion 102B of second chain link 100A such that the upper surfaces 108A, 108B and lower surfaces 110A, 110B of the body portions 102A, 102B of each chain link 100A, 100B are generally parallel to one another. To ensure that chain links will have the same orientation when interlocked, this step should be done with the upper surfaces 108A, 108B of the chain links 100A, 100B facing each other.

Figure 3:
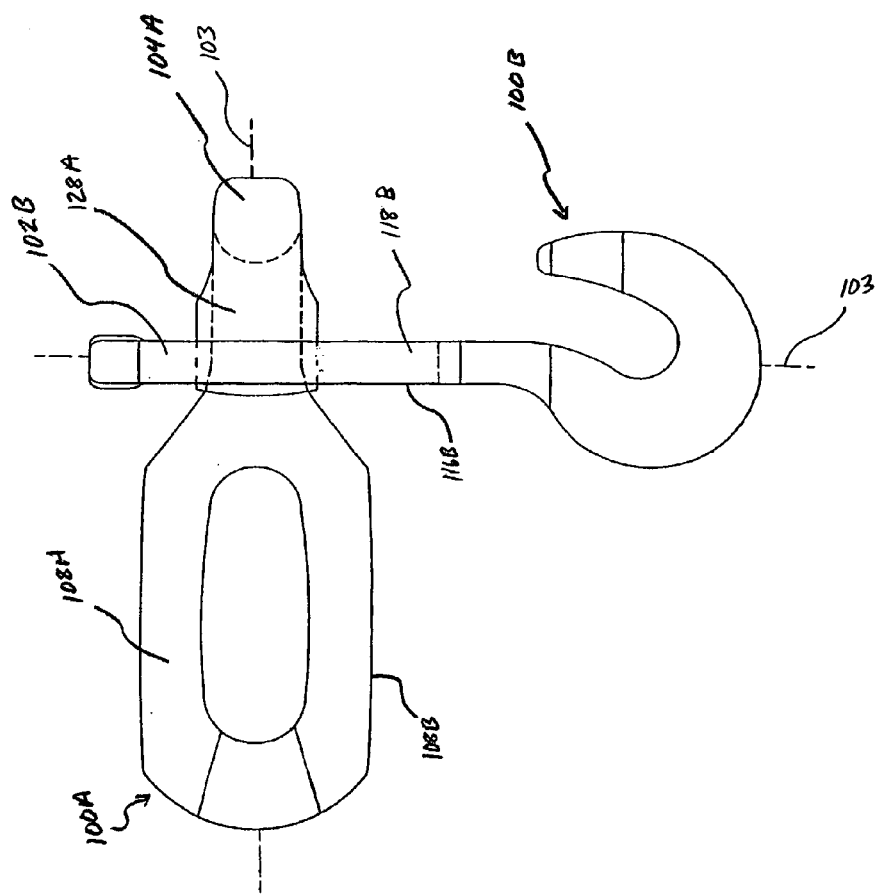
FIG. 3 is a view of a pair of chain links according to the present disclosure.

Next, as illustrated in FIG. 3, the chain links 100A, 100B are rotated 90 degrees relative to each other in a generally non-parallel relationship. The tip portion 128A of the first chain link 100A now extends through the aperture 106B of the second chain link 100B. Upper 108A and lower 110A surfaces of the body portion 102A of the first chain link 100A are now perpendicular to the upper 108B and lower 110B surfaces of the body portion 102B of the second chain link 100B.

Figure 4:
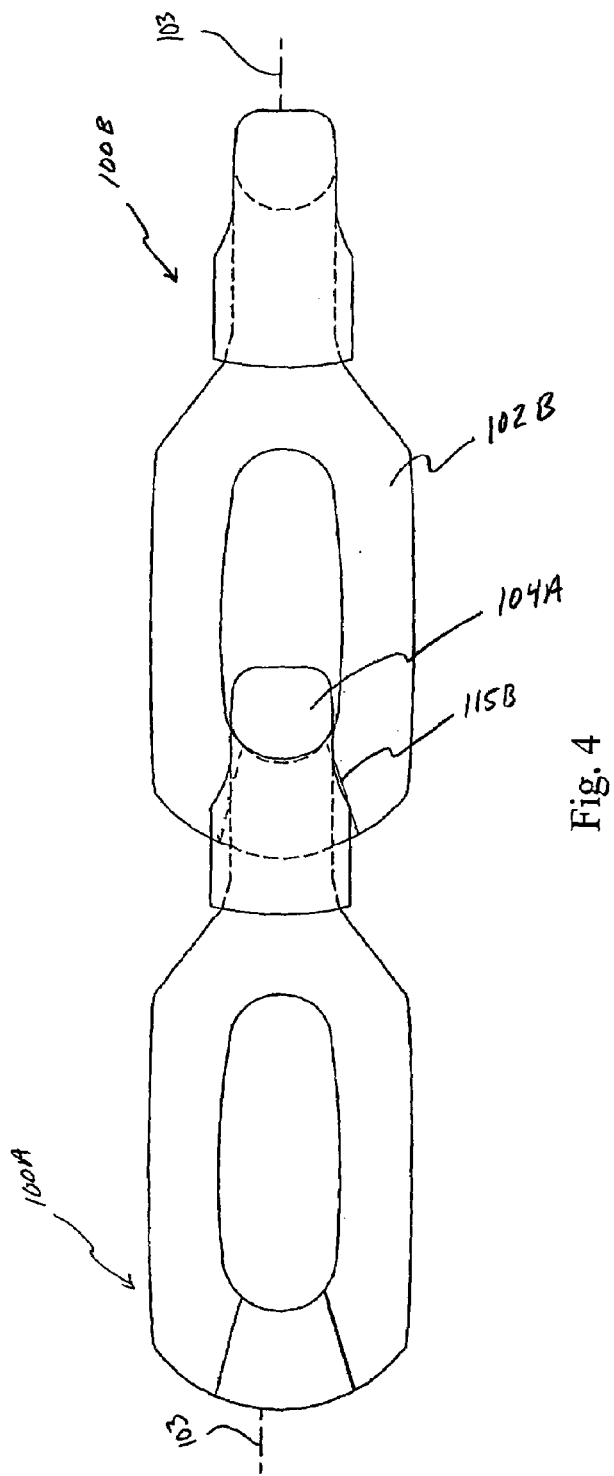
FIG. 4 is a top view of a pair of interlocked chain links according to the present
Figure 5:
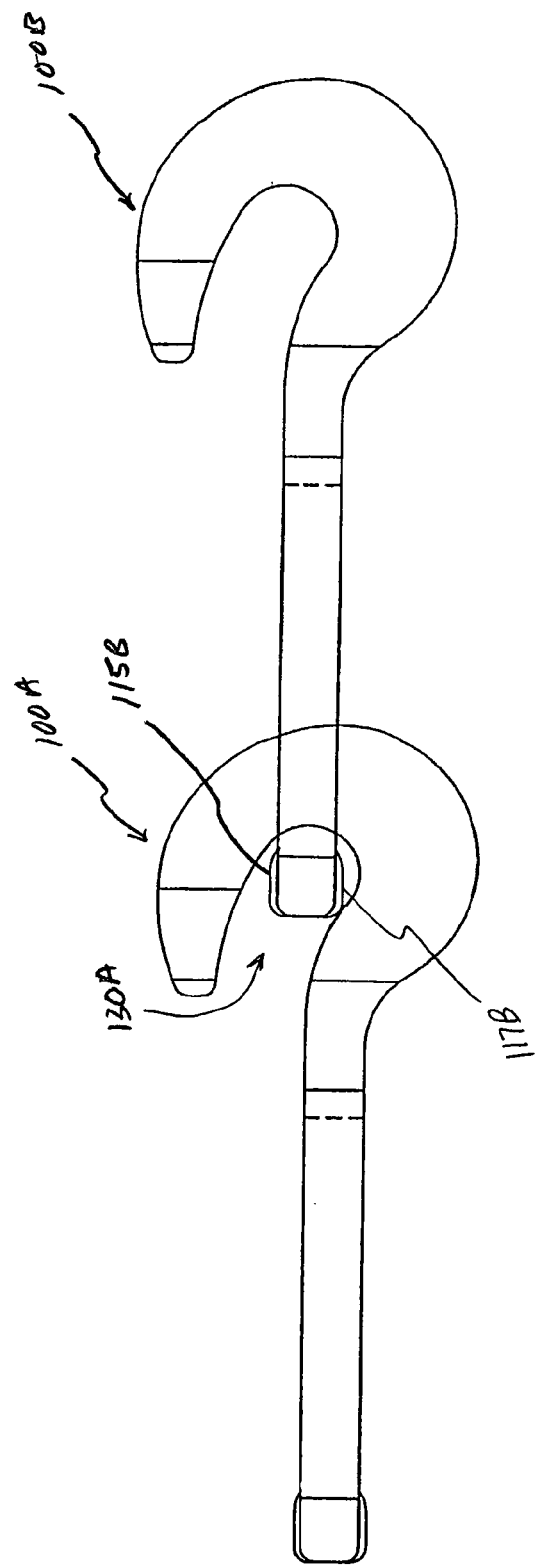
FIG. 5 is a side view of a pair of interlocked chain links according to the present disclosure.

Finally, as can be seen in FIGS. 4 and 5, second chain link 100B is further rotated, in two 90 degree rotations (one rotation about the longitudinal axis 103 of the first chain link 100A and the second rotation to bring the axes 103 of the respective links 100A, 100B into coaxial alignment), so that it has the same orientation as first chain link 100A. Recess 130A of hook portion 104A of the first chain link 100A now surrounds the bearing surfaces 115B, 117B of the body portion 102B of the second chain link 100B. This configuration provides a more wear-resistant chain because the stresses caused between adjacent chain links during operation are focused on the wear-resistant bearing surfaces 115B, 117B.

Alternatively, the first and second interlocking steps above (illustrated in FIGS. 2 and 3) can be done in the reverse order. First, the tip portion 128A of the first chain link 100A can be inserted through the aperture 106B in the second chain link 100B such that the upper 108A, 108B and lower 110A, 110B surfaces of the chain links 100A, 100B are perpendicular to each other. In order to ensure that the chain links will have the same orientation once they are interlocked, tip portion 128A should be inserted through the aperture 106B upwardly from lower surface 110B to upper surface 108B. Next, the chain links 100A, 100B can be rotated 90 degrees relative to each other so that their upper 108A, 108B and lower 110A, 110B surfaces are parallel to each other. The chain links 100A, 100B can then be put in the same orientation to have the same resulting configuration as the previously described interlocking method, depicted in FIGS. 4 and 5.

Figure 6:
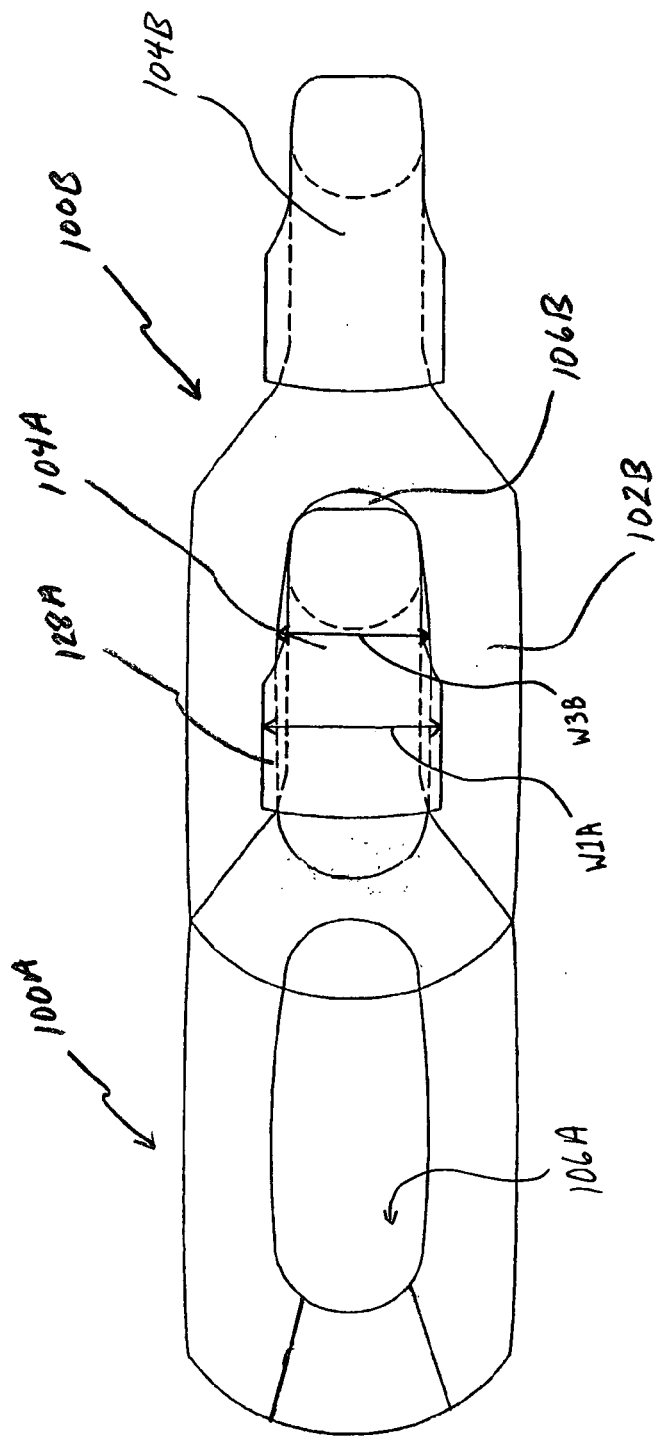
FIG. 6 is a top view of a pair of interlocked chain links according to the present disclosure.

Since the tip portion 128 has a greater width W1 than the width W3 of the aperture 106, first 100A and second 100B chain links are now interlocked. Chain links 100A and 100B can only be removed from one another by following the above steps in reverse order. Axial shifting of links 100A, 100B relative to one another is not effective to unlock links 100A, 100B. FIG. 6 depicts a chain link configuration (links 100A and 100B being axially shifted toward one another) where prior art chains would often become detached. Hook portion 104A of first chain link 100A is positioned over aperture 106B of body portion 102B of second chain link 100B. This configuration may result from excessive slack in the chain or from an object falling onto the chain. Previously, chains would often become detached in this configuration due to hook portion of the first chain link falling through the aperture of the second chain link. However, chain links 100A, 100B according to the present disclosure will not become detached. Tip portion 128A of the first chain link 100A is wider (width W1A) than the aperture 106B (width W3B) of the second chain link 100B, so the first chain link 100A cannot fall through the second chain link 100B and detach.

Figure 7:
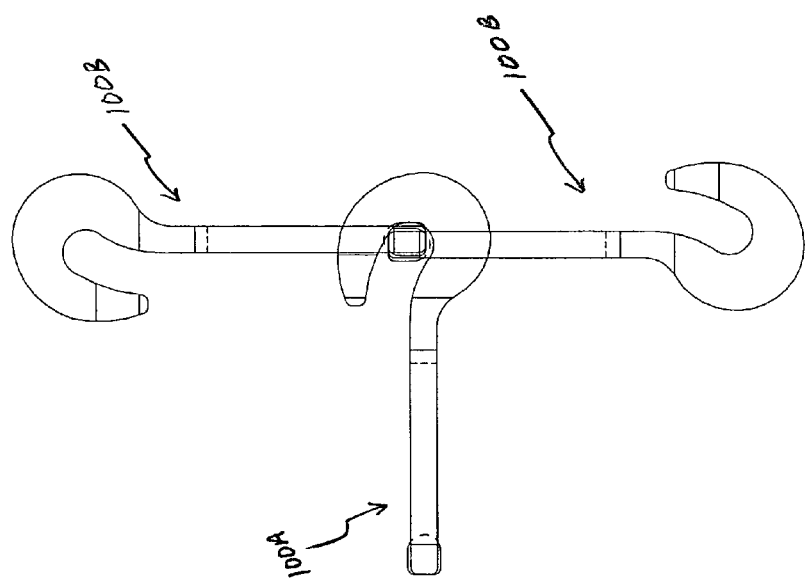
FIG. 7 is a side view of a pair of interlocked chain links according to the present disclosure.

In addition, chain links 100A, 100B are capable of twisting relative to one another and remaining interlocked. Chain links 100A, 100B are flexible enough to twist at least 80 degrees to one side or at least 160 degrees total relative to one another. Even if the chain links 100A, 100B are twisted relative to one another, tip portion 128A still will not go through aperture 106B and detach the chain. Further, chain links 100A, 100B are capable of rotating over 180 degrees relative to one another, as depicted in FIG. 7. This flexibility reduces the stress placed on chain links 100A, 100B during operation which reduces the likelihood of system failure due to inadvertent detachment.

In operation, chain links 100 are interlocked with one another to form an endless chain. Such chains can be used in power driven conveyors in saw mills, manure pits, and other material handling units. A series of flights can be welded to a plurality of the chain links in a chain. The flights extend downwardly at an angle from the chain and move material along the path of the chain when the conveyor is operated. A suitable flight that may be used with the chain links of the present disclosure is disclosed in U.S. Pat. No. 3,447,667.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The invention claimed is:

1. A chain link for use in a material mover chain comprising:
    a body portion connected to a hook portion;
    wherein the body portion has an aperture therethrough;
    wherein the hook portion has a tip portion;
    wherein a width dimension of the tip portion is greater than a width dimension of the aperture;
    wherein the hook portion defines a recess which is adapted to receive a bearing surface on body portion; and
    wherein the bearing surface projects outwardly from an upper surface of body portion.

2. The chain link of claim 1, wherein the recess is further adapted to receive a second bearing surface projecting outwardly from a lower surface of body portion.

3. A chain link for use in a material mover chain comprising:
    a body portion connected to a hook portion;
    a material mover flight welded to the chain link;
    wherein the body portion has an aperture therethrough;
    wherein the hook portion has a tip portion; and
    wherein a width dimension of the tip portion is greater than a width dimension of the aperture.

4. A material mover chain comprising:
    a plurality of chain links interlocked with each other, wherein each chain link comprises:
        a body portion integrally formed with a hook portion;
        wherein the body portion has an aperture therethrough;
        wherein the hook portion has a tip portion; and
        wherein a width dimension of the tip portion is greater than a width dimension of the aperture;
    wherein the hook portion of each chain link defines a recess, and wherein the recess of each chain link receives a bearing surface on the body portion of an adjacent chain link; and
    wherein the bearing surface of each chain link projects outwardly from an upper surface of each chain link.

5. The material mover chain of claim 4, wherein each chain link has a second bearing surface projecting outwardly from a lower surface of each chain link that is received within the recess of an adjacent chain link.

6. A material mover chain comprising:
a plurality of chain links interlocked with each other, wherein each chain link comprises:
  a body portion integrally formed with a hook portion;
  wherein the body portion has an aperture therethrough;
  wherein the hook portion has a tip portion; and
  wherein a width dimension of the tip portion is greater than a width dimension of the aperture; and
wherein a plurality of said chain links have material mover flights welded thereon.

* * * * *